Patented July 25, 1933

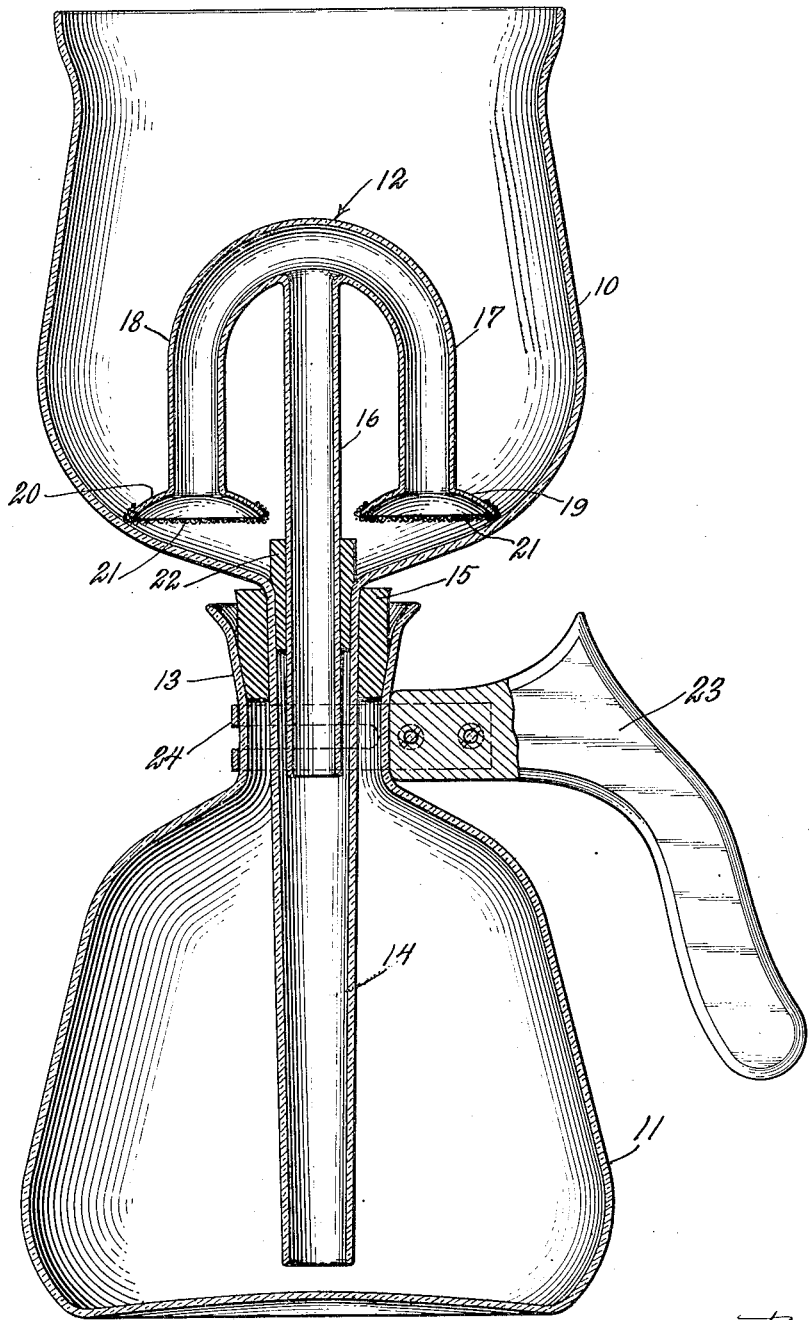

1,920,121

UNITED STATES PATENT OFFICE

IRVING E. BAUGHMAN, OF CHICAGO, ILLINOIS, ASSIGNOR, BY MESNE ASSIGNMENTS, TO V. R. WEAST, OF CHICAGO, ILLINOIS

APPARATUS FOR MAKING COFFEE

Application filed May 2, 1931. Serial No. 534,556.

This invention has reference to an apparatus for making coffee and has special reference to an apparatus for creating a differential pressure between two receptacles whereby liquid is forced from one to the other to become infused with the coffee and is subsequently filtered back into the first receptacle.

More particularly, this invention relates to an apparatus comprising upper and lower receptacles having a siphon tube communicating therebetween, the upper receptacle containing the coffee and the lower receptacle containing the liquid for infusion with the coffee upon steam being generated in the liquid receptacle. A condensation of the steam in the lower receptacle starts a siphon action of the siphon tube to raise the infusion upwardly therein through filters then back into the lower receptacle.

In making an infusion of coffee it is desirable to permit the coffee to steep at a temperature just below the boiling point for some length of time until all the soluble elements are extracted therefrom rather than to boil the infusion whereafter, in the latter instance, a substantial amount of tannic acid will be found to be present. The instant invention contemplates the making of coffee by infusion at a temperature lower than boiling, the operation to be automatic.

It is the further contemplation of this invention to provide a novel apparatus for making coffee in the above recited manner in which all of the elements of the construction with which the ingredients contact is non-metallic to avoid any contamination of the coffee, by reason of a chemical reaction with the metal of the apparatus. The receptacles are preferably formed of glass as is the siphon tube, the sealing members therebetween being preferably formed of pure gum rubber which latter is non-absorbing and non-tasting.

One of the objects of this invention is to provide an apparatus of the type referred to above in which the elements contacting with the coffee are non-metallic.

A further object of this invention is to provide an apparatus of the character noted above wherein the coffee is made by infusion with liquid below the boiling point, the operation thereof being automatic.

Another object of this invention is to provide an apparatus as indicated above having upper and lower receptacles with a siphon tube communicating therebetween for permitting the passage of liquid therethrough from the lower to the upper receptacle and a subsequent forced siphoning of the infusion from the upper to the lower receptacle.

Other objects and advantages of this invention will hereinafter be more fully described and for a more complete understanding of the characteristic features of this invention reference may now be had to the following description when read together with the accompanying drawing, in which latter:

The figure comprises a vertical central sectional view of the apparatus embodying the features of this invention.

Referring now more particularly to the drawing, the apparatus shown therein comprises an upper coffee receptacle 10 and a lower liquid receptacle 11 having a siphon tube 12 communicating therebetween. All of the elements are preferably formed of glass or other vitreous material. The glass or other material must, of course, be heat-resisting in order to prevent cracking due to an expansion or contraction thereof. Also, it has been found with the use of a non-metallic material, such as glass, that the usual chemical reaction obtained in the making of coffee in a metallic vessel is avoided to improve the taste of the infusion and to make the same chemically pure.

The lower glass receptacle 11 is preferably formed with a retracted neck portion 13 flared at the upper end thereof in order that the elements associated therewith may be introduced thereinto quite readily. The upper receptacle 10 is preferably substantially funnel-shaped, having a flared upper end opening and a downwardly projecting tubular portion 14 at the lower end thereof.

A sealing member 15 in the form of a gasket is provided near the juncture of the tubular portion 14 with the receptacle on the outside thereof for engaging the inner periphery of the flared neck 13 to afford a sealed relation between the tubular portion 14 and the lower receptacle. This sealing member is preferably formed of pure gum rubber which is non-absorbing and non-tasting, whereby any coffee coming in contact therewith will not be affected. The lower open end of the tubular portion 14 of the upper receptacle extends to a point in close proximity to the base of the lower receptacle 11 in order to prevent the entire displacement of the liquid in the lower receptacle in its operation which will hereinafter be more fully described.

The siphon tube 12 preferably comprises a main stem 16 having its lower end inserted into the tubular portion 14 of the upper receptacle, the upper end of the main stem terminating at a substantial height in the upper receptacle and communicating with a plurality of branches 17 and 18, which latter extend downwardly therefrom and have flared end portions 19 and 20, respectively. The open lower end of the flared portions of the branches are covered with any suitable filtering material such as muslin and is secured thereto with a draw string, or any other suitable securing means. The lower end of the main stem 16 may extend any desired distance into the tubular member 14, although the only purpose thereof is to secure the same relatively to the tubular member 14, there being preferably a sealed relation therebetween which is provided by means of a pure gum rubber gasket 22 on the outer periphery of the main stem for engagement with the inner periphery of the upper portion of the tubular member 14.

In order to handle the apparatus when the liquid therein is heated, a handle 23 of any desired shape is provided and has a strap 24 secured to one end thereof for passing around the neck 13 of the lower receptacle. The entire apparatus may be moved at will by the handle because of the association of the various members to fit within the lower receptacle.

In the operation of the above apparatus heat is applied to the lower receptacle 11 to heat the liquid therein whereafter when the water comes to a boil steam is generated, the pressure of which forces the water from the lower receptacle through the tubular portion 14 of the upper receptacle, the main stem 16 and the branch stems 17 and 18 into the upper receptacle where it infuses the coffee therein. All of the water in the lower receptacle will subsequently pass into the upper receptacle with the exception of that amount of water in the receptacle beneath the lower end of the tubular member 14 which is purposely permitted to remain to cover the entire bottom of the receptacle to prevent the cracking of the glass.

The liquid forced into the upper receptacle is slightly below the boiling point and, although heat is continued to be supplied to the apparatus in the lower receptacle for an indefinite length of time still the liquid in the upper receptacle remains just below the boiling point which permits the coffee to steep until all the soluble elements are extracted from the coffee, whereafter the application of heat to the apparatus is discontinued.

As there is no heat applied to the lower receptacle, what steam is left therein condenses and forms a vacuum which draws the coffee infusion from the upper receptacle through the filter cloths 21 upwardly through the branches 17 and 18 and thence through the main stem 15 back into the lower receptacle 11. The upper receptacle 10 and the siphon tube 12 therein together with the sealing members are lifted from the lower receptacle 11, which latter is used as a pour-out for the coffee.

While but a single embodiment of this invention is herein shown and described, it is to be understood that various modifications thereof may be apparent to those skilled in the art without departing from the spirit and scope of this invention and, therefore, the same is only to be limited by the scope of the prior art and the appended claims.

I claim:

1. In a device of the character described, a lower liquid receptacle having a retracted neck portion, an upper coffee receptacle having a downwardly projecting tubular portion for engagement with said neck portion and extending to a point near the bottom of said lower receptacle, a one-piece siphon tube contained wholly within said upper receptacle and tubular portion comprising a main stem extending into said tubular portion and at least one branch extending downwardly to a point near the bottom of said upper receptacle.

2. In a device of the character described, a lower liquid receptacle having a retracted neck portion, an upper coffee receptacle having a downwardly projecting tubular portion for engagement with said neck portion and extending to a point near the bottom of said lower receptacle, a one-piece siphon tube contained wholly within said upper receptacle and tubular portion including a main stem extending into said tubular portion and at least one branch extending downwardly and having a flared end thereon at a point near the bottom of said upper receptacle.

3. In a device of the character described, a lower liquid receptacle having a retracted neck portion, an upper coffee receptacle having a projecting tubular portion extending downwardly to a point near the bottom of said lower receptacle and having a sealed relation with said neck portion, a one-piece siphon tube contained wholly within said upper receptacle and tubular portion including a main stem projecting into and having a sealed relation with said tubular portion for communication with said lower receptacle and at least one branch extending downwardly to a point near the bottom of said upper receptacle.

4. In a device of the character described, a lower glass receptacle having a retracted neck portion, an upper substantially funnel-shaped glass receptacle having the spout thereof extending through said neck portion to a point adjacent the bottom of said lower receptacle, sealing means between said spout and said neck, and a one-piece glass siphon tube contained wholly within said upper and lower receptacles, said siphon tube comprising a main stem sealed in said spout for communication with said lower receptacle and at least one branch from the upper end of said main stem extending downwardly to a point adjacent the bottom of said upper receptacle.

5. In a device of the character described, a lower glass receptacle having a retracted neck portion, an upper substantially funnel-shaped glass receptacle having the spout thereof extending through said neck portion to a point adjacent the bottom of said lower receptacle, sealing means between said spout and said neck, and a one-piece glass siphon tube contained wholly within said upper and lower receptacles, said siphon tube comprising a main stem sealed in said spout for communication with said lower receptacle and at least one branch from the upper end of said main stem extending downwardly to a point adjacent the bottom of said upper receptacle, said branch having a flared open end enclosed by a filtering means.

IRVING E. BAUGHMAN.